March 17, 1936.  H. J. DARCEY  2,034,460
PROCESS FOR TREATING SEWAGE
Filed July 18, 1932
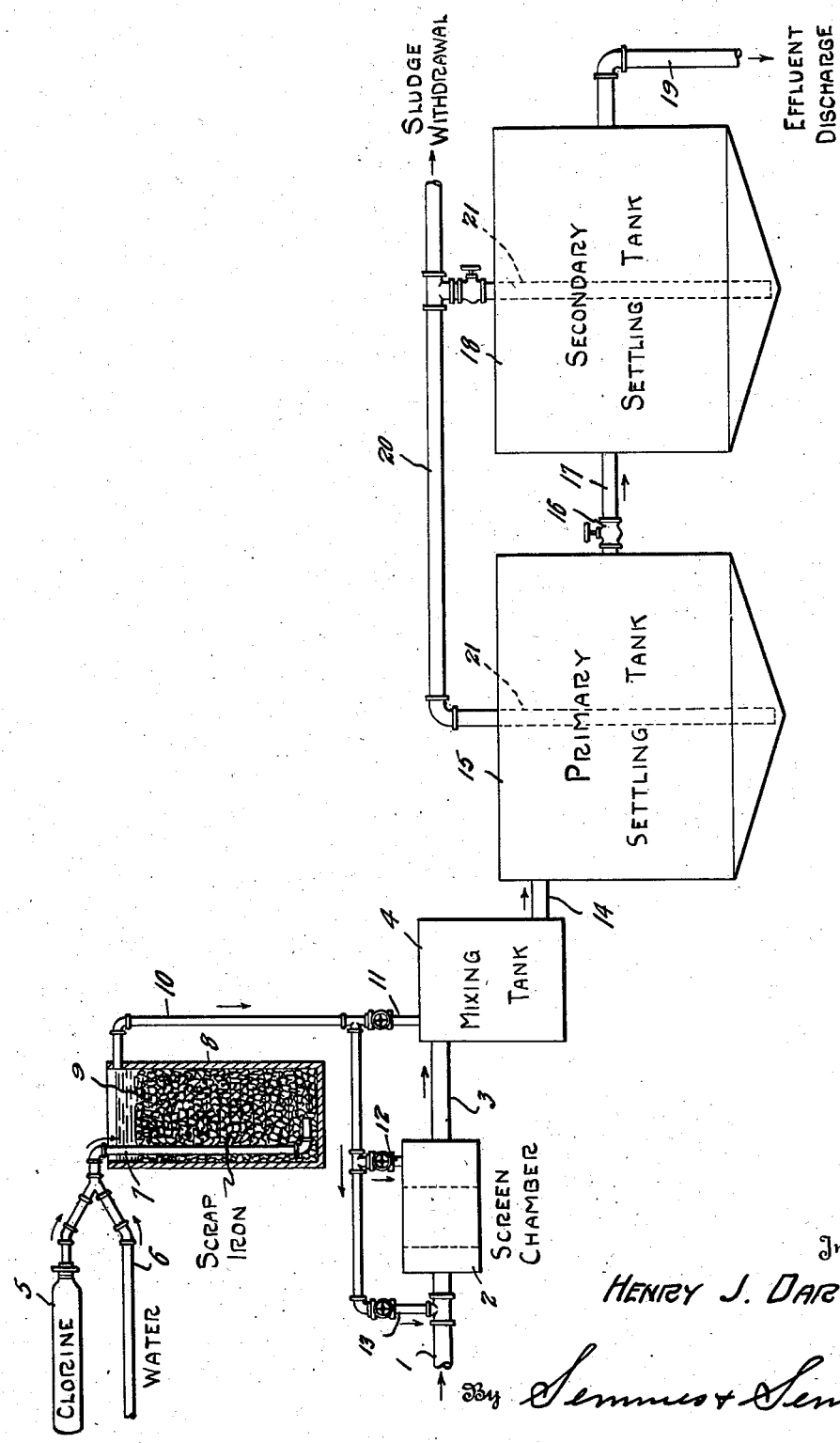
Inventor
HENRY J. DARCEY
By Semmes & Semmes
Attorneys Patented Mar. 17, 1936

2,034,460

UNITED STATES PATENT OFFICE 2,034,460

PROCESS FOR TREATING SEWAGE

Henry J. Darcey, Oklahoma City, Okla.

Application July 18, 1932, Serial No. 623,222

7 Claims. (Cl. 210—2)

This invention relates to a process and apparatus for treatment of water sewage and other industrial wastes.

The disposal of sewage and other industrial waste has presented real problems. The prior methods proposed and employed have been generally based upon the acceptation that the problem is largely biological.

These trade wastes, besides containing relatively large amounts of organic and inorganic aggregates, also contain a considerable amount of solid material in finely divided form either as suspensoids or colloids.

I have found that by utilizing suitable materials and subjecting the sewage or waste to a proper treatment a very large and almost quantitative removal of the suspended and dissolved solids may be obtained.

A major object of the present invention therefore is to provide a novel process for the disposal of sewage or trade waste.

Another object is to provide an improved treating agent in sewage disposal.

A further object is to provide a novel apparatus for treating sewage.

Another object is to provide a novel water treatment.

In order to enable a ready comprehension of the invention, a diagrammatic illustration of a plant layout is shown in the accompanying drawing.

I have found that by utilizing new and improved treating agents at proper points an improved process of sewage disposal may be achieved. As a result of the utilization of the treating agents and of the apparatus, to be described, sewage may be effectively treated in a minimum of time so as to produce an effluent which can be disposed of without substantial dilution. Additional advantages of the improvement are that the process is largely chemical and is not materially dependent on bacterial or biological action. Due to the simplicity and efficacy of the process the plant cost is considerably reduced and the operating expenses diminished.

I have found as a result of considerable experimentation in this field that if a very effective coagulating agent is provided the sedimentation of suspended and dissolved solids may be considerably accelerated. I have found further that a specially prepared iron solution forms such an improved treating agent. In view of the special character of this solution and its peculiar effect in the treatment, for the sake of a term to distinguish it from commercial ferric chloride it is designated as peptized iron solution.

In accordance with one phase of the invention, therefore, specially prepared peptized iron solution is mixed with the influent to a sewage plant and as a result of the use of this from 85 to 98% of the suspended solids may be precipitated and removed from the solution.

The efficacy of this special solution appears to depend in part upon its method of manufacture, for it has been found that by testing commercial ferric chloride, such as is available on the market, with the peptized solution prepared in accordance with the process hereinafter described, there is a considerable difference in results. In accordance with the improved form of the invention the peptized iron solution may be prepared by passing an aqueous chlorine solution in contact with relatively finely divided iron. In one improved method a tank may be filled with scrap iron and a chlorine solution is injected into the bottom of the tank. The solution flows upwardly through the tank and reacts with the iron. While no absolute statement is made either as to the composition of the treating agent or as to its action upon or reaction with the sewage, it is nevertheless believed that as a result of the reaction of the iron and chlorine in active state, hydrochloric acid and hypochlorous acid is obtained. This solution is applied, as such, to the sewage to be treated.

Similarly, the specific reaction of the peptized solution on the sewage is difficult of explanation. As pointed out above, the present improved treating agent differs from commercial ferric chloride. It is thought that some liberation of oxygen takes place from the solution employed and that this has a marked effect in stabilizing the effluent from the plant. It may be that the iron chloride is partly hydrolized by the water and that complex colloid bodies are formed which present a relatively high specific adsorption for some of the colloids in the sewage, thus causing their coagulation and precipitation. It is to be noted here that the use of the solution in the present invention is quite different from prior usage of ferric chloride in sewage treatment, as where it is employed to condition a sludge. Again, the efficacy of the present material may be due in part to the fact that it is employed in a, so to speak, nascent condition before any change in the solution takes place. There is a possibility of a new valency of iron. However, whatever may be the mechanism of the coagulation or precipitation involved, it is found as a matter of fact that this improved solution is peculiarly effective as a coagulant and that in some cases it serves to remove up to 98% of the suspended solids in the sewage undergoing treatment.

The improved reagent acts very rapidly on the sewage and upon addition forms a flock or flocculent precipitate in the fluid which very effectively enmeshes and precipitates a large proportion of the suspended matter. It has been found furthermore that by utilizing this reagent a very material reduction in the B-Coli content of the sewage is obtained.

It has been found that the improved reagent is of general utility in sewage treatment and may be employed with any sewage plant. However, it is peculiarly efficacious under some circumstances and particularly when employed in conjunction with a novel process about to be described.

As shown in the drawing, the influent to the treating apparatus may be led in through inlet pipe 1. This pipe communicates with any desired screening apparatus 2, the purpose of which, as is well known in the art, is to separate the coarse materials contained in the influent. From the screen chamber the sewage, now consisting of an impure solution, is passed through discharge pipe 3 to a mixing tank 4.

In the natural process of decomposition of sewage, as is known, hydrogen sulphide is formed. This in turn reacts with the ammonia compounds naturally contained in the sewage to form ammonium sulphide or similar ammoniated products. In carrying out the present process, if sufficient ammonium compounds are not naturally present it is contemplated that ammonia shall be added to the sewage, preferably at some point prior to the screening and in sufficient quantities to completely convert the hydrogen sulphide into ammonium sulphide.

According to the present invention and as intimated hereinbefore, a special treating solution is made up. This may be produced by conjoining streams of chlorine gas from the tank 5 and water from any suitable source of supply through line 6 and passing the aqueous chlorine solution through pipe 7 into the bottom of tank 8. This tank is filled with iron in relatively finely divided form, as shown at 9. The speed of flow of the chlorine solution is so regulated as to achieve optimum reaction at the point of discharge from the tank. The solution flowing upwardly through the iron reacts therewith and is drawn off at the top through discharge pipe 10. With discharge pipe 10 communicate the valved branches 11, 12 and 13. The highly active freshly prepared solution from the tank may be admitted either to the influent pipe 1, to the filtrate from the screen chamber 2, or directly to the mixing tank 4, or to any two or more of these places as the condition of the sewage indicates.

The mixing tank 4, as will be understood, is provided with suitable agitating mechanism so as to insure a thorough incorporation of the treating solution with the sewage, industrial waste or water. From the mixing tank the treated sewage is passed through the discharge line 14 into a primary settling tank 15.

During the course of treatment thus far and as indicated above, it will be understood that the several reactions proceed. As pointed out, due to natural decomposition, in some instances accelerated or increased by the addition of ammonia, ammonium compounds in the sewage combine with the hydrogen sulphide to form ammonium sulphide according to the following general equation:

$$2NH_4OH + H_2S \rightarrow (NH_4)_2S + 2H_2O$$

As pointed out above, when the specially prepared iron chloride solution is added to the sewage a flock is formed which enmeshes or entrains the suspended matter and causes the coagulation of the latter. This formation of the flock is likely due to the fact that the iron chloride is converted to a flocculent iron hydrate. At the same time, experiments indicate that nascent oxygen is liberated, probably from the excess hydrochlorous acid, and thus supplies the oxygen demand of the sewage.

During the course of the passage of the sewage through the appartus thus far described the iron salt appears to combine with the ammonium sulphide to form iron sulphide which is thrown out as a black percipitate. This precipitate, together with the enmeshed or entrained suspended matter, is allowed to settle out in the base of the primary settling tank 15. The supernatant and partially clarified liquor is drawn off from the primary settling tank through the valve 16 and line 17 and is discharged into the secondary settling tank 18. If desired, to the partially clarified liquor from the primary settling tank may be added a predetermined quantity of chlorine or hydrochlorous acid. These reagents serve to decompose the ferric sulphide remaining in the solution to cause the precipitation of sulphur. The precipitated sulphur thus settles out in the secondary settling tank. As a result of the reaction of the chlorine or equivalent reagent upon the liquid from the primary settling tank iron chloride is formed or regenerated; this, as noted above, is converted to hydrated form and due to its formation in situ acts very effectively as a precipitant for any residual suspended matter that may be present in the solution in the secondary settling tank. The reactions taking place upon the addition of hydrochlorous acid clarified solution are illustrated by the following general equation:

$$Fe_2S_3 + 6HClO \rightarrow 2FeCl_3 + 3H_2O + 3S + 3O$$

While certain of these treating agents have been described as applied at specific points in the process, it will be understood that they may be applied in proper proportions to the raw sewage or trade waste and mixed therewith either in the sewer line, baffle mixing tank or mechanical mixer wherever it is determined that the best results can be obtained. It will be understood that the points of injection of these treating agents and the amounts employed will vary considerably depending upon the compositon of the different sewages.

The clarified liquid from the second settling tank may be drawn off through the effluent discharge 19. It will be understood that, in accordance with the practice well known to those skilled in the art, the effluent discharge from the secondary settling tank or the partially clarified material from the primary settling tank may be drawn off and recycled to different portions of the system for such purposes as accelerating the coagulation of the influent material, for back washing and so forth. The solid material separated out in tanks 15 and 18 may be drawn off, by means of the sludge pump, through lines 20 and 21 respectively and passed thence to suitable treating appartus. This sludge may be passed through a sludge press, filter or centrifuge to remove the solid material from the liquid and the liquid may be disposed of in any desired manner. If desired separate sludge drawoffs may be provided for primary settling tank 15 and the secondary settling tank 18 and, after separation of the solids from the liquids, the liquids may be separately employed. Thus sludge may be withdrawn from the tank 15 and passed through a filter or centrifuge and the filtrate may be passed by a return line to the influent line 3 to assist in coagulation of the incoming material. The solid material obtained from the sludge separators may be suitably disposed of, as by incineration.

If desired the effluent liquid discharged through the line 19 may be given any desired after treatment, such as chlorination or aeration, and, as is understood by those skilled in the art, may be reemployed in the process as a wash water. Whenever necessary this effluent, which in some instances may contain a small amount of flock in suspended solids, may be passed through a filtering medium which is operated and controlled similarly to the filters used in the treatment of water and commonly known as rapid sand filters. These filters may, for example, contain a filtering material coarser than that used in the rapid sand filters, as employed for water purification, and may be operated, for example, in excess of two gallons per minute per square foot of filter area.

Where the clarified effluent from discharge pipe 19 is employed for a filter back wash, the resulting wash waste, which contains the flocculent material caught on the surface of the filter, may be stored and returned in proper proportions to the untreated sewage for the purpose of augmenting the coagulation and for reducing the cost of treatment.

It will be understood that instead of back washing the filters these may be cut out of operation for a short period of time and the wash water may be allowed to enter very slowly to float off the filter surface mat. This method materially reduces the amount of wash water necessary, resulting in a decrease in cost of operation.

It will be understood that while the operation has been described with respect to the disposition of sewage, certain phases of the treatment are of a wider applicability. Thus it is contemplated that the special treating agent prepared tank 8 may be employed in the treatment of water supplies, for it has been found that by properly controlling the concentration of this treating solution is is directly applicable to the treatment of water supplies for the purpose of coagulation and settling.

As noted above, the quantities of the reagents employed and their concentration will vary over a relatively wide range and depend upon the composition of the particular sewage. As a typical example which has proved effective in practice, a treating solution may be made up using approximately 125 lbs. of chlorine and 100 lbs. of iron. Thus it will be seen that an excess of chlorine is employed for the treating agent. In this particular respect the present treating agent differs markedly from the typical commercial ferric chloride. In the present process the excess of chlorine appears in the treating agent as hypochlorous acid and must be present at all times to produce the proper results. Therefore, in contradistinction to the typical commercial ferric chloride, the present treating agent may be considered as an oxidizing iron chloride solution.

While a preferred process has been described and specific reagents indicated, it will be understood that these are given largely by way of example. The major concept of the invention is considered to reside in the discovery of the efficacy of the special iron chloride treating solution with or without the combination of the other reagents in the association of process steps described. It is, therefore, not intended to limit the invention to the particular description given except as such limitations are clearly imposed by the appended claims.

I claim:

1. A process of treating sewage which comprises treating iron in finely divided form with an excess of aqueous chlorine and immediately adding the resulting solution to the sewage.

2. A process of treating sewage which comprises adding to the sewage sufficient ammonia to convert the hydrogen sulphide to ammonium sulphide and then adding an oxidizing iron chloride solution to precipitate iron sulphide and separating the precipitate from the liquid.

3. A process of treating sewage which comprises adding to the sewage sufficient ammonia to convert the hydrogen sulphide to ammonium sulphide and then adding a reagent which will react with the ammonium sulphide to form a precipitate.

4. A method of treating sewage which comprises adding to the sewage sufficient ammonia to combine with the hydrogen sulphide present, adding to the sewage a material which forms a flock and which reacts with the ammonia sulphide to form an insoluble sulphide, and then separating the liquid from the precipitated matter.

5. A method of treating sewage which comprises adding to the sewage sufficient ammonia to combine with hydrogen sulphide, adding to the sewage a freshly prepared solution made by reacting iron with an excess of aqueous chlorine; separating the resulting settlings from the liquid, then treating the liquid with an agent which will react with the sulphur compounds in the liquid to precipitate sulphur therefrom.

6. A method of treating sewage which comprises adding to the sewage a freshly prepared solution made by reacting iron in finely divided form with an aqueous chlorine solution containing an excess of chlorine; agitating the sewage after such addition, adding to the sewage a sufficient amount of ammonia to convert the sulphides present to ammonium sulphide, separating the solid material from the liquid, withdrawing the partially clarified liquid and adding thereto a quantity of hypochlorous acid.

7. The process of treating sewage which comprises treating iron with an excess of aqueous chlorine in such a manner that the major portion of the chlorine combines with the iron to form a solution, and immediately adding the solution to the sewage.

HENRY J. DARCEY.